United States Patent
Namiki et al.

(10) Patent No.: US 7,901,099 B2
(45) Date of Patent: Mar. 8, 2011

(54) BACKLIGHT DEVICE, LAMP CLIP, AND CHASSIS FOR BACKLIGHT

(75) Inventors: Toru Namiki, Chula Vista, CA (US); Masaki Shimizu, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 107 days.

(21) Appl. No.: 12/065,879

(22) PCT Filed: Sep. 5, 2006

(86) PCT No.: PCT/JP2006/317539
§ 371 (c)(1),
(2), (4) Date: Mar. 5, 2008

(87) PCT Pub. No.: WO2007/029692
PCT Pub. Date: Mar. 15, 2007

(65) Prior Publication Data
US 2009/0046445 A1    Feb. 19, 2009

(30) Foreign Application Priority Data

Sep. 6, 2005   (JP) ................... 2005-258542
Nov. 30, 2005  (JP) ................... 2005-345064
Jul. 28, 2006  (JP) ................... 2006-206625

(51) Int. Cl.
*G09F 13/04*    (2006.01)
*F21V 21/00*    (2006.01)
*F21S 4/00*     (2006.01)

(52) U.S. Cl. ............... 362/97.1; 362/217.14; 362/225

(58) Field of Classification Search ............... 362/97.1, 362/97.2, 29, 634, 225, 217.14, 217.16, 97.4
See application file for complete search history.

(56) References Cited

U.S. PATENT DOCUMENTS

| | | | |
|---|---|---|---|
| 7,192,149 B2 * | 3/2007 | Lai | 362/29 |
| 7,364,321 B2 * | 4/2008 | Chen et al. | 362/225 |
| 2005/0073858 A1 * | 4/2005 | Kim et al. | 362/561 |

FOREIGN PATENT DOCUMENTS

| | | |
|---|---|---|
| JP | 62-12008 U | 1/1987 |
| JP | 5-83422 U | 11/1993 |
| JP | 8-93734 A | 4/1996 |
| JP | 10-326516 A | 12/1998 |
| JP | 2001-248613 A | 9/2001 |
| JP | 2004-139876 A | 5/2004 |
| JP | 2005-19420 A | 1/2005 |
| JP | 3653272 B2 | 3/2005 |
| JP | 2005-203154 A | 7/2005 |
| JP | 2005-276717 | 10/2005 |

* cited by examiner

*Primary Examiner* — Jong-Suk (James) Lee
*Assistant Examiner* — David R Crowe
(74) *Attorney, Agent, or Firm* — Birch, Stewart, Kolasch & Birch, LLP

(57) ABSTRACT

An object is to prevent fall of a lamp clip due to an external factor such as vibration or impact. It is structured that a reflective member 30 provided inside a backlight device has fitting holes 32 each including an insertion hole 32*b* and a holding hole 32*a*, a pair of fitting holes 32 are provided in a direction where the holding holes 32*a* with respect to the insertion holes 32*b* are mutually opposed, a pair of locking sections 16 on a substrate 12 of a lamp clip 10 are inserted into the insertion holes 32*b* in the fitting holes 32, and thereafter, the lamp clip 10 is rotated counter-clockwise or clockwise, so that the locking sections 16 are held in the holding hole 32*a*.

10 Claims, 9 Drawing Sheets

(a)

(b)

(a)

(b)

(c)

(a)

(b)

(c)

(a)

(b)

(c)

(a)

(b)

(c)

BACKLIGHT DEVICE, LAMP CLIP, AND CHASSIS FOR BACKLIGHT

This application is national phase under 35 U.S.C. §371 of PCT International Application No. PCT/JP2006/317539 which has an international filing date of Sep. 5, 2006 and designated the United States of America.

BACKGROUND

1. Technical Field

The present invention relates to a backlight device, in which a reflector that reflects light from light sources is installed on a chassis by lamp clips, a lamp clip and a chassis for backlight.

2. Description of Related Art

In a liquid crystal display device, a backlight device has been used in which fluorescent tubes are supported on a reflector. Since the length of the fluorescent tubes becomes larger with an increase in screen size of the liquid crystal display device and the diameter of the fluorescent tubes decreases with reduction in thickness of the device, lamp clips have been installed on the reflector to support the fluorescent tubes (see Patent Reference 1, for example).

FIG. 8 shows views showing an example of the lamp clip: FIG. 8(a) is a top view of the lamp clip; FIG. 8(b) is a side view thereof; and FIG. 8(c) is a schematic side view at the time of installation. A lamp clip 1 is provided with U-shaped supporting tools 14, each catching and supporting a fluorescent tube 34 from its both sides, on both short-side sides of a top surface of a rectangular-shaped base body 12, and provided with an upper projection 20 that supports at the central portion of the top surface of the base body 12 a diffusion plate 38 under a liquid crystal panel 40. Further, at the central portion of an under surface of the base body 12, a columnar-shaped lower projection 4, with its end formed in a turned-back shape, is provided.

The lower projection 4 of the lamp clip 1 is inserted into circular through hole 3a provided in a reflector 3, a circuit board 6a and a chassis 6, and is pushed until the turned-back portion of the end thereof passes through the chassis 6, whereby it is possible to integrally hold the reflector 3, the circuit board 6a and the chassis 6 by the lamp clip 1, and install the lamp clip 1 on the reflector 3. It is to be noted that the number of the lamp clips 1 increases in proportion to the number of fluorescent tubes.

With the end of the lower projection 4 of the lamp clip 1 formed in the turned-back shape, the lamp clip 1 is configured so as to be easily installed and reliably fixed to the extent that a detachment of the lamp clip 1 is difficult. However, in the case of detaching the lamp clip 1 for repairing the reflector 3, the circuit board 6a or the chassis 6, there is a problem in that a repairing or recycling operation takes labor and time due to the difficulty in detachment of the lamp clip 1, thus preventing efficient repair. Especially when the size of the liquid crystal panel is large, the number of the lamp clips is also large, to increase labor and time taken for the repair.

In order to resolve such inconvenience, the applicant filed Patent Reference 2 prior to the present application, and in Patent Reference 2, as shown in FIG. 9(a), it is configured that gourd-shaped fitting holes 32, each formed by communication through a constriction between an insertion hole 32a into which the lower projection 4 (in FIG. 8) of the lamp clip is inserted and a holding hole 32b into which the lower projection 4 are engaged for holding the lamp clip, are provided in the reflector and the like, and as shown in FIGS. 9(b) and 9(c), the lamp clip can be installed by sliding, and removed and exchanged from the light source arrangement side.

[Patent Reference 1] Japanese Patent No. 3653272
[Patent Reference 2] Japanese Patent Application Laid-Open No. 2005-276717

SUMMARY

In the case of the backlight device described in Patent Reference 2 above, for example in a vibration environment during transport of the product, a lower projection of the lamp clip might move from the holding hole to the fitting hole, leading to undesirable fall of the lamp clip from the reflector and the like.

When the light sources such as the fluorescent tubes are driven while the brightness thereof is controlled by means of a dimmer signal such as a PWM signal type, a phenomenon of vibration almost equivalent to a frequency of the dimmer signal might occur in the light sources, which induces vibration of the lamp clips and is further transmitted to the reflector and a chassis of the backlight device, to cause occurrence of a so-called chattering phenomenon.

In the case of the backlight device described in Patent Reference 2, at the time of installing or detaching the lamp clip by an operator, stress might be applied on the light sources such as the fluorescent tubes due to stress functioned by the operator, which as a result causes a problem of inducing damage on the light sources housed inside the backlight device.

In the backlight device described in Patent Reference 2, to since the fitting hole is configured by communication between the insertion hole and the holding hole, it is necessary to design the fitting hole of a size larger than the cross section of the lower projection of the lamp clip. However, when the fitting hole is designed to have a larger size, a phenomenon of light leakage to a back surface of the backlight chassis might occur depending upon the design (in particular, light leakage from the insertion hole may occur).

This symptom could becomes a problem to the extent that the light leakage is visible from a back surface of the backlight device through a heat release outlet of a cabinet or the like, and induces a problem unignorable in terms of quality of a liquid crystal display device. Further, that problem can appear more significantly when the number of lamp clips increases with an increase in size of a display screen.

The present invention was made in view of such circumstances, and it is an object of the present invention to provide a backlight device, which enables an operator to perform operations of installing and detaching a lamp clip at the same operating position, and is capable of preventing undesirable fall of the lamp clip due to an external factor such as vibration or impact. It is also an object of the present invention to provide a backlight device capable of suppressing the chattering phenomenon in which vibration of the light sources transmits to a chassis and the like through the lamp clip at the time of dimmer-control drive.

It is an object of the present invention to provide a backlight device, which enables the operator to perform the operations of installing and detaching the lamp clip at the same operating position, and is capable of preventing a problem of damage on the light sources that could occur at the time of installing or detaching the lamp clip. It is also an object to provide a backlight device in which an operation of exchanging the light sources is easily performed.

It is an object of the present invention to provide a backlight device, which enables the operator to perform the operations of installing and detaching a lamp clip at the same operating position, and has high quality, being free of occurrence of the phenomenon of light leakage to the back surface of a backlight chassis.

Further, although the lamp clip described in Patent Reference 2 facilitates detachment of the reflector and the like, since the fitting hole is configured to have a shape of communication between the insertion hole and the holding hole, endurance strength against impact from the outside is weak, e.g. the lamp clip being held in the holding holes unfortunately moves to the insertion holes due to impact from the outside or the like and then falls.

Since the fitting hole is configured to have the shape of communication between the insertion hole and the holding hole, the insertion hole may not be covered by the lamp clip in a state where the lamp clip has been held in the holding hole after inserted into the insertion hole and then slid to the holding hole. Therefore, the light from the light sources might transmit from this uncovered portion to a back surface of the reflective member, and might further leak to the outside of the backlight device. This reduces the quality level of the backlight device. Moreover, this might cause reduction in luminance at the portion of the insertion hole, thereby to affect the display screen.

The present invention was made in view of such circumstances, and it is an object of the present invention to prevent fall of the lamp clip due to the external factor such as vibration or impact.

Further, since the end of the lower projection 4 of the lamp clip 1 is formed in a turned-back shape, installation of the lamp clip 1 is easy and also, detachment of the lamp clip 1 is difficult, thereby allowing reliable fixing of the lamp clip. However, in the case of detaching the lamp clip 1 for repairing the reflector 3, the circuit board 6a or the chassis 6, there is a problem in that it takes labor and time for the repair due to the difficulty in detachment of the lamp clip 1 to result in inefficient repair. Especially in the case of the liquid crystal panel having a large size, the number of lamp clips is large, to increase the labor and time for the repair.

The present invention was made in view of such circumstances, and it is an object of the present invention to provide a backlight device, in which the lamp clip has engagement sections to be engaged with the chassis in its planar region by being functioned in a vertical direction to the vertical direction to a surface of the planar region of the chassis, thereby enabling easy installation and detachment of the lamp clip installed on the chassis.

It is another object of the present invention to provide a backlight device, in which the engagement section at least includes a projecting section (projection) provided in the light source supporting section (clip) and a hole in a prescribed shape provided in the planar region of the chassis, thereby enabling easy fixing and detachment of the lamp clip with a simple configuration of projections and holes.

It is another object of the present invention to provide a backlight device, in which the lamp clip is engaged by a rotational function with the surface of the planar region of the chassis, thereby enabling prevention of fall of the lamp clip due to the external factor such as vibration or impact.

It is another object of the present invention to provide a backlight device and a lamp clip, in which the lamp clip is provided with two projections, and the chassis is provided with two fitting sections which are engaged respectively with the projections in the case of the two projections moving in the mutually opposite directions, thereby enabling prevention of fall of the lamp clip due to the external factor such as vibration or impact.

It is another object of the present invention to provide a backlight device, in which the light sources have linear portions and configured in a plurality of number, and the linear portions are arranged in a mutually substantially parallel manner inside the chassis and the engagement section is functioned in a parallel direction to a longitudinal direction of linear portions of the light sources so as to be engaged, thereby enabling easy performance of the operation of detaching the lamp clip without danger of damaging the linear light sources such as the fluorescent tubes.

It is another object of the present invention to provide a backlight device, which has a reflecting means for reflecting light from the light sources to an opening section of the chassis, and in which as a result of engagement of the lamp clips with the chassis by the engagement sections, the reflecting means is caught between the lamp clips and the chassis, thereby facilitating performance of an operation of assembling or detaching the reflecting means such as the reflector arranged or installed inside the chassis.

It is another object of the present invention to provide a backlight device, which further has a substrate provided with light sources for applying light from the light sources to the opening section of the chassis, and in which as a result of engagement of the lamp clips with the chassis by the engagement sections, the substrate is caught between the lamp clips and the chassis, thereby facilitating performance of the operation of assembling or detaching the substrate such as an LED substrate arranged or installed inside the chassis.

It is another object of the present invention to provide a backlight device and a chassis for backlight, in which the fitting section has a narrow section at the midpoint of the hole and one portion and the other portion bordered by the narrow section of the hole have different areas, thereby enabling assembling or detachment of the lamp clip while making discrimination between the regions for insertion and detachment of the projecting section of the lamp clip by means of the narrow section of the hole.

It is another object of the present invention to provide a backlight device, in which the lamp clip is provided with light source supporting means for supporting the light sources, thereby enabling reliable fixing of the positions of the linear light sources such as the fluorescent tubes which are parallelly arranged.

It is another object of the present invention to provide a backlight device, in which the lamp clip is provided with a diffusion plate supporting means for supporting a diffusion plate, thereby enabling the diffusion plate to be supported at a position separated from the reflector with a prescribed spacing.

It is an object of the present invention to solve at least one of the foregoing problems.

In order to achieve the above objects, there is provided a backlight device for liquid crystal display, comprising: light sources which emit light to be applied to a liquid crystal panel; a lamp clip for holding said light sources; and a locked plate to which locking sections of said lamp clip are locked, wherein said locking plate includes: insertion holes into which said locking sections are inserted, and holding holes provided in communication with said insertion holes.

A backlight device of the present invention was configured to have: linear light sources; lamp clips for holding the linear light sources; and a locked plate to which locking sections provided on a base body of the light clip are locked, wherein the locked plate has insertion holes into/from which the locking sections are inserted/pulled out, and holding holes in which the locking sections are locked, and a direction in which the insertion hole and the holding hole are linked has a prescribed angle of α(0°<α<90°) against the longitudinal direction of the linear light sources.

Further, a plurality of pairs of the insertion holes and the holding holes may be provided, and the plurality of pairs of the insertion holes and the holding holes may be concentrically provided.

Moreover, a backlight device of the present invention was configured to have: linear light sources; lamp clips for holding the linear light sources; and a locked plate to which locking sections provided on a base body of the light clip are locked, wherein the locked plate has insertion holes into/from which the locking sections are inserted/pulled out, and holding holes in which the locking sections are locked, and the direction in which the insertion hole and the holding hole are linked is horizontal to the longitudinal direction of the linear light sources.

Further, at this time, a plurality of pairs of the insertion holes and the holding holes may be provided, and the insertion holes and the holding holes in the plurality of pairs may be juxtaposed in the vertical direction to the longitudinal direction of the linear light sources.

Further, a plurality of the holding holes may be provided, and a direction in which the plurality of the holding holes are linked may be vertical to the longitudinal direction of the linear light sources.

The insertion hole may have a shape with an area larger than that of the holding hole.

Further, the lamp clip may have a shape of covering the insertion holes in a state where the locking sections are locked in the holding holes.

Furthermore, the lamp clip may simultaneously hold a plurality of linear light sources.

The locking section may have an end section and a projecting section that links the end section and the base body, and the end section may have a larger cross sectional area than that of the projecting section on a cross section parallel to a front surface of the base body.

Furthermore, the locked plate may be a chassis or a reflector.

A liquid crystal display device of the present invention was configured to include a backlight device according to claim 1, and a liquid crystal panel.

According to the present invention, it is possible to prevent the phenomenon in which the lamp clip undesirably falls from the locked plate in a vibration environment, so as to improve the performance of maintaining the installed state of the lamp clip. Further, it is possible to suppress the chattering phenomenon in which vibration of the light sources at the time of dimmer-control drive transmits to the chassis and the like through the lamp clip.

According to the present invention, it is possible to easily perform the operations of installing and detaching the lamp clip without damaging the light sources. Further, in the case of using the lamp clip capable of simultaneously supporting a plurality of the light sources, it becomes possible to perform the operations of installing and detaching the lamp clip in the state of supporting the plurality of the light sources, so as to facilitate collective exchange of the plurality of the light sources.

According to the present invention, it becomes possible to provide a backlight device with high quality free of occurrence of the phenomenon of light leakage from the lamp clip installed portion to the back surface of the backlight chassis. It further becomes possible to simultaneously suppress or eliminate occurrence of local luminance unevenness on the liquid crystal display screen caused by the above-mentioned configuration.

According to the present invention, it is possible to prevent fall of the lamp clip due to the external factor such as impact. It is further possible to improve the quality level as the backlight device.

According to the present invention, a backlight device is provided which is capable of easily installing and detaching the lamp clip installed on the chassis.

According to the present invention, a backlight device is provided which is capable of easily installing and detaching the lamp clip with a simple configuration of projections and holes.

According to the present invention, a backlight device is provided which is capable of preventing fall of the lamp clip due to the external factor such as vibration or impact.

According to the present invention, a backlight device is provided which is capable of easily performing the operation of detaching the lamp clip without danger of damaging the linear light sources such as fluorescent tubes parallelly arranged inside the chassis.

According to the present invention, performance of the operation of assembling or detaching the reflector and the LED substrate arranged or installed inside the chassis is facilitated. Namely, it becomes possible to perform the operation of assembling or detaching the lamp clip with the reflector or the substrate held by one hand, so as to improve the productive efficiency of the operator.

According to the present invention, it becomes possible to assemble or detach the lamp clip while making discrimination between the regions for insertion and detachment of the projecting section of the lamp clip by means of the narrow section of the hole.

According to the present invention, a backlight device is provided which is capable of reliably fixing the positions of the linear light source such as the fluorescent tubes which are parallelly arranged.

According to the present invention, a backlight device is provided which is capable of supporting the diffusion plate at a position separated from the reflector with a prescribed spacing.

BRIEF DESCRIPTION OF THE SEVERAL VIEWS OF THE DRAWINGS

FIG. 1(a) is a plan view; and FIG. 1(b) is a side view;

DESCRIPTION OF THE NUMERALS

Figure 1:
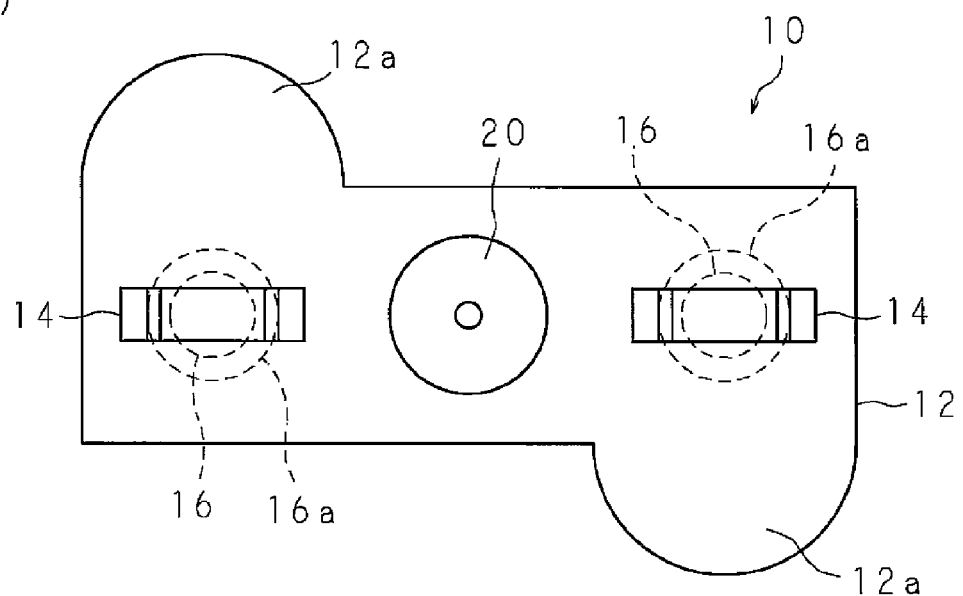
FIG. 1 shows views showing an example of a lamp clip according to the present invention.
Figure 1:
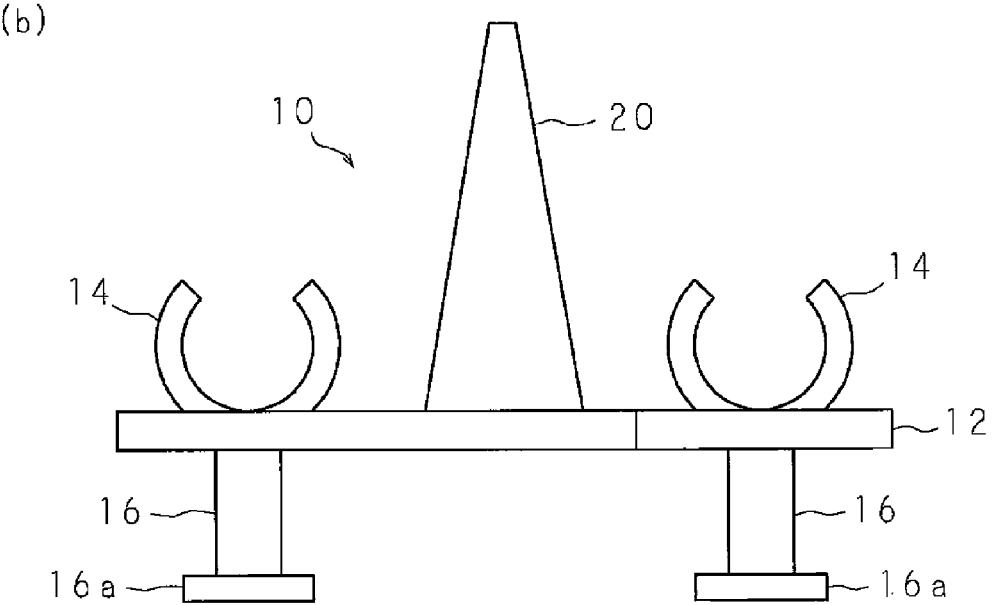

10, 11 Lamp clip
12 Base body

14 Supporting tool
16 Lower projection
20 Upper projection
30 Reflector
32, 33 Fitting hole
32a, 33a Holding hole
32b, 33b Insertion hole
34 Fluorescent tube
36 Chassis
38 Diffusion plate
40 Liquid crystal panel

DETAILED DESCRIPTION

In the following, the present invention is specifically described based upon drawings showing embodiments thereof.

First Embodiment

FIG. 1 is a view showing an example of a lamp clip (clip) according to the present invention, which holds linear light sources such as fluorescent tubes and also fixes a reflective member and the like to a locked plate such as a backlight chassis: FIG. 1(a) is a plan view; and FIG. 1(b) is a side view. A lamp clip 10 is provided with U-shaped supporting tools (light source supporting means) 14 that catches and holds fluorescent tubes (linear light sources) on both short-side sides of a top surface (namely, a surface opposed to a liquid crystal panel) of a plate-shaped base body 12, and provided with an upper projection (diffusion plate supporting means) 20 that supports at the central portion of the top surface of the base body 12 an optical member such as a diffusion plate located under the liquid crystal panel and between the fluorescent tubes and the liquid crystal panel.

Further, on both short-side sides of an under surface (namely, a surface opposed to the reflective member) of the base body 12, columnar-shaped lower projections (projections) 16 are provided as locking sections with the ends thereof projecting in circular disc shape. Further, on side surface portions of the long sides of the base body 12, semi-circular coating pieces 12a are provided in the state of projecting so as to be in point-symmetry with respect to the upper projection 20. Namely, with the reflective member in a fixed state, the base body 12 is formed in a shape of having projecting sections projecting so as to cover the insertion holes 32b.

It is to be noted that as the linear light source, one formed by providing a plurality of LEDs (light emitting diodes) inside a lamp tube may be used in place of the fluorescent tube. Further, a backlight device including both the fluorescent tube and the LED may be applied.

A fitting hole (fitting section), into which the lower projection 16 of the lamp clip 10 is fitted, is provided on a bottom surface of a box-shaped chassis (chassis for backlight) having the reflector 30, a circuit board (e.g. a board mounted with the LEDs) and an opening section. The fitting hole (hole) is formed, through a narrow section, of an insertion hole 32b formed in a size of allowing the lower projection 16 to be inserted thereinto, and a holding hole 32a formed in a size of allowing the lower projection 16 to be held therein. Specifically, it is, for example, a potbellied through hole where one portion and the other portion bordered by the narrow section of the opening have different opening areas. The opening area of the holding hole 32a is formed smaller than that of the insertion hole 32b.

Figure 2:
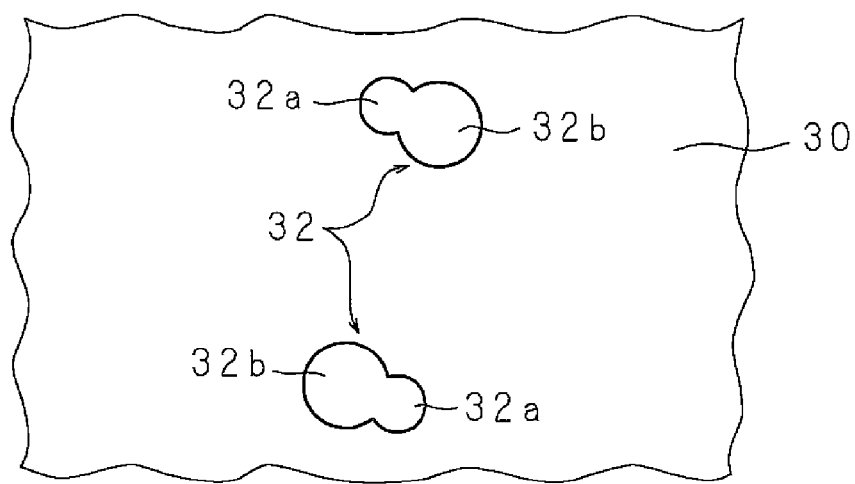
FIG. 2(a) is a plan view of a substantial part of a reflector.
FIGS. 2(b) and 2(c) are plan views showing an example of installation of a lamp clip.
Figure 2:
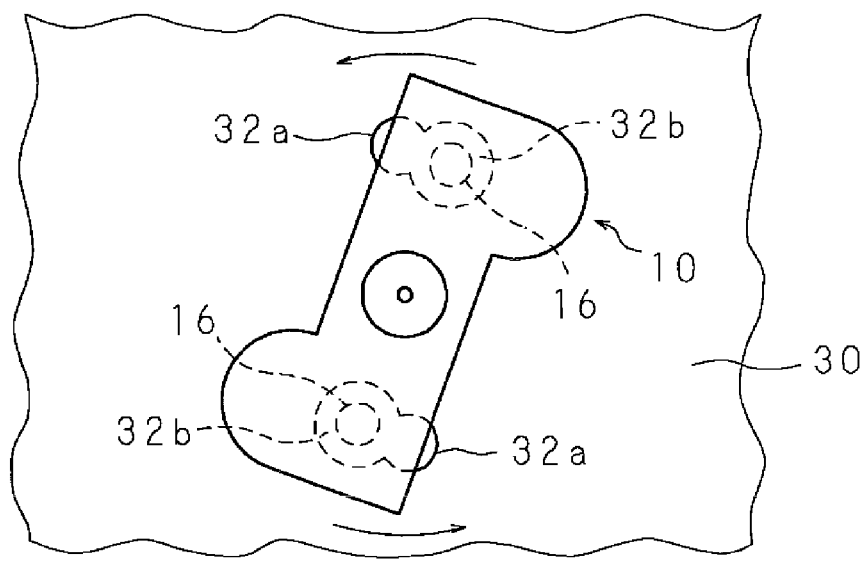
Figure 2:
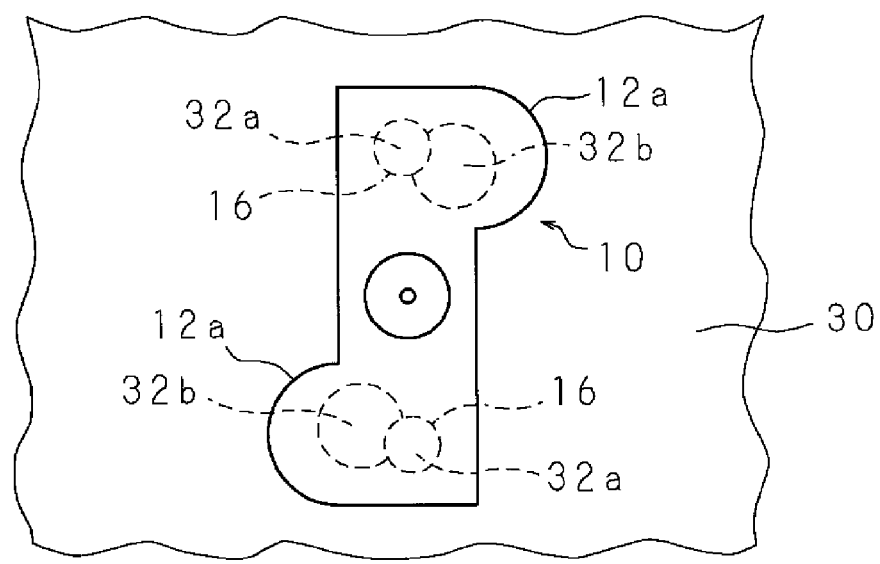

FIG. 2(a) is a plan view of the substantial part of the reflector 30. As described above, the fitting hole 32 has the insertion hole 32b into which the lower projection 16 of the lamp clip 10 is inserted, and the holding hole 32a which catches and holds the lower projection 16 moved from the insertion hole 32b along a surface of the fitting hole 32. The opening of the insertion hole 32 has a size larger than that of the end 16a of the lower projection 16 of the lamp clip 10 and allows the end 16a to be inserted thereinto, and the opening of the holding hole 32a has a size almost the same as that of the lower projection 16 of the lamp clip 10 and allows the lower projection 16 to be fitted (caught) thereinto.

Further, here, two fitting holes 32 are concentrically provided, and the holding holes 32a with respect to the insertion holes 32b are arranged in the mutually opposed directions. In the example of FIG. 2(a), the two fitting holes 32 are arranged above and below (in the vertical direction to a longitudinal direction of the fluorescent tubes, namely, a direction of arrangement of a plurality of the fluorescent tubes) in juxtaposition, where the holding hole 32a in the upper-side (or one) fitting hole 32 is arranged to the left of the insertion hole 32b, and the holding hole 32a in the lower-side (or the other) fitting hole 32 is arranged to the right of the insertion hole 32b. Namely, the holding holes 32a are arranged at positions opposite to the insertion holes 32b respectively constituting the fitting holes 32 (in point-symmetry).

Here, the space between the centers of the two holding holes 32a is almost the same as the space between the centers of the two lower projections 16 of the lamp clip 10, and the space between the centers of the two insertion holes 32b is almost the same as the space between the centers of the two lower projections 16 of the lamp clip 10.

FIGS. 2(b) and 2(c) are plan views showing an example of the process of installing the lamp clip 10. Here, a circuit board, not shown, is present under the reflector 30, a chassis, not shown, is present under the circuit board, and the same fitting holes 32 are provided in the reflector 30, the circuit board and the chassis, and respectively superimposed at the same position. Further, the lower projection 16 of the lamp clip 10 has a height slightly larger than a thickness of the superimposed reflector 30, circuit board and chassis. Moreover, the supporting tools 14 of the lamp clip 10 are omitted in FIGS. 2(b) and 2(c). As shown in FIG. 2(b), the two lower projections 16 of the lamp clip 10 are respectively inserted into the insertion holes 32b in the fitting hole 32. It is noted that the lower projections 16 are inserted until the base body 12 of the lamp clip 10 comes into contact with the reflector 30. After the insertion, as shown in FIG. 2(c), the lamp clip 10 is rotated counter-clockwise with respect to a rotational central axis which is the center of the base body 12 (center between the respective insertion holes in the pair of fitting holes) and oriented in the vertical direction to a surface of the locked plate such as the surface of the reflector or a bottom surface of the chassis, and the lower projections 16 are fitted into the holding holes 32 in the fitting holes 32, to hold the lamp clip 10. When the lower projections 16 are fitted (caught) into the holding holes 32a, the reflector 30, the circuit board and the chassis are integrally held and fixed, and the lamp clip 10 is installed on the reflector 30 with the ends 16a of the lower projections 16 and the base body 12.

At this time, since the insertion holes 32b are covered by the covering pieces 12a of the lamp clip 10, light emitted from the light sources (fluorescent tubes) do not pass through the holding holes 32a. This enables prevention of light leakage from the back surface of the backlight chassis. Here, typically, luminance unevenness is more likely to occur on the display screen with an increase in size of the lamp clip, but the covering pieces 12a of the present embodiment are formed to have projections in an irreducible minimum shape capable of covering the insertion holes 32b, namely a shape similar to a peripheral shape of the insertion hole 32b (here, arc shape), while the lower projections 16 of the lamp clip 10 are fitted in the holding holes 32a, whereby it is possible to prevent light leakage to the back surface of the backlight chassis while suppressing occurrence of local luminance unevenness on the liquid crystal display screen.

In the case of detaching the lamp clip 10, the lamp clip 10 is rotated clockwise with the center of the base body 12 as the rotational central axis, and the lower projections 16 are removed from the holding holes 32a in the fitting holes 32, moved to the insertion holes 32b, and pulled out from the insertion holes 32b. As thus described, it is possible for the operator to perform both operations of installing and detaching the lamp clip 10 in the state of facing the opening section of the backlight chassis, so as to perform operations of assembling and dissembling the backlight device more easily than in the conventional manner.

Figure 3:
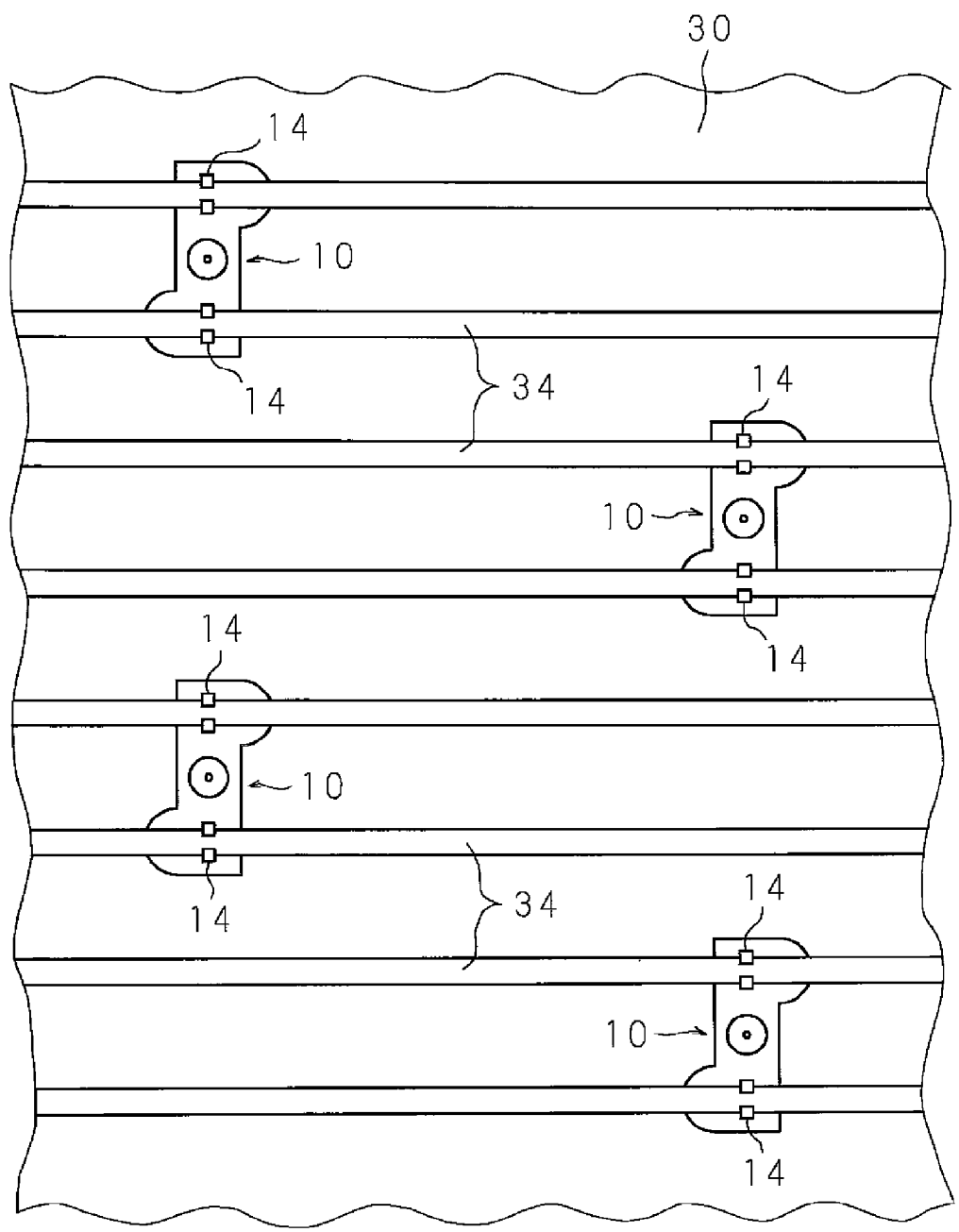
FIG. 3 is a plan view showing an example of the reflector installed with the lamp clips.

The lamp clips 10 are installed on a plurality of parts of the reflector 30. FIG. 3 is a plan view showing an example of the reflector 30 installed with the lamp clips 10. The lamp clips 10 are not aligned on the reflector 30, but the lamp clips adjacent to each other in the arranged direction of the fluorescent tubes, namely the odd-numbered lamp clip and the even-numbered lamp clip are arranged so as to be located at different positions in the longitudinal direction of the fluorescent tubes. Further, the supporting tools 14 of the lamp clips 10 support the fluorescent tubes 34.

Figure 4:
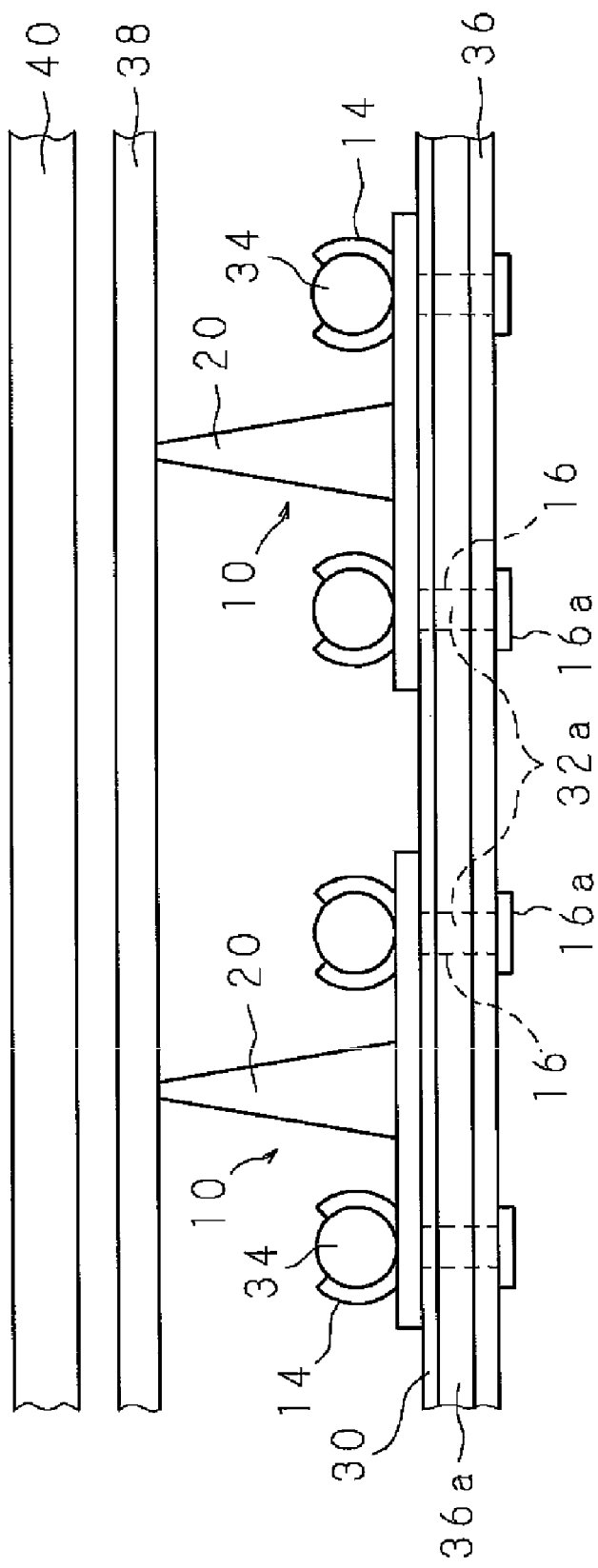
FIG. 4 is a schematic side view showing an example of installation of a diffusion plate and a liquid crystal panel with respect to the backlight device.

Moreover, above the lamp clips 10 (in a projecting direction of the upper projection 20), the diffusion plate and the liquid crystal panel are provided in the state of covering the opening section of the chassis. FIG. 4 is a schematic side view showing an example of installation of the diffusion plate and the liquid crystal panel with respect to the backlight device. The diffusion plate 38 is supported by the upper projections 20 of the lamp clips 10, and the liquid crystal panel 40 is arranged over the diffusion plate 38 (the opposite side to the fluorescent tube 34).

Further, the light source supporting tools 14 provided on the surface of the plate-shaped base body 12, which is opposed to the liquid crystal panel, respectively support a plurality of parallelly arranged fluorescent tubes, thereby to fix arrangement positions of the fluorescent tubes. Moreover, the locking sections 16 provided on the surface of the base body 12, which is opposed to a front surface of the reflective member, are engaged into the fitting holes in the chassis, so that the lamp clips 10 are fixed in a state where the reflector and the bottom surface of the chassis are caught by the ends 16a located at the ends of the lower projections 16 and the base body 12. The lamp clips 10 are fixed to the chassis in such a state, thereby allowing the reflector to be reliably fixed between the chassis and the lamp clips 10.

Furthermore, as described above, the circuit board 36a is arranged under the reflector 30 (the opposite side to the light sources), and the chassis 36 is arranged under the circuit board 36a. Therefore, by fixing of the lamp clips 10 to the chassis, the members such as the reflector and the circuit board are reliably fixed to the bottom surface of the chassis. Further, in the present embodiment, a direction in which the circuit board 36a and the insertion hole 32b in the fitting hole 32 are linked, namely, a direction in which the lamp clip 10 moves at the time of installation/detachment, is formed to have a prescribed angle of $\alpha(0°<\alpha<90°)$ against the longitudinal direction of the fluorescent tubes 34. As thus described, by allowing a moving direction of the lamp clip 10 at the time of installation/detachment and the longitudinal direction of the fluorescent tubes 34 to have an angle component, it is possible to prevent the locking sections 16 of the lamp clip 10 from undesirably moving from the holding holes 32a to the insertion holes 32b and the lamp clip 10 from falling.

It is to be noted that, while the prescribed angle $\alpha$ is desirably as small as possible since the angle $\alpha$ being an extremely large angle may necessitate an increase in total area of the fitting hole in the chassis, since on the other hand, there could be a problem in which the lamp clip may fall from the holding hole in the vibration environment or the like when the angle $\alpha$ is too small, the angle $\alpha$ is desirably an angle formed, for example, in a state where the circular insertion hole and holding hole are adjacently arranged (approximately, the order of 5° to 30°).

Further, as described above, it is structured that the fitting holes 32 each including the holding hole 32a and the insertion hole 32b are concentrically provided in a plurality of number and the lamp clip 10 is rotated clockwise or counter-clockwise so as to be installed on the reflector 30 in a state where the plurality of the locking sections 16 of the lamp clip 10 are respectively inserted in the plurality of the fitting holes 32, whereby it becomes possible to absorb in the lamp clip 10 vibration of the fluorescent tubes 34 at the time of dimmer-control drive of the fluorescent tubes 34, so as to suppress the chattering phenomenon in which the vibration of the fluorescent tubes 34 transmit to the chassis and the like. Moreover, a direction in which the holding holes 32a in the pair of fitting holes 32 are linked is made vertical to the longitudinal direction of the fluorescent tubes 34, whereby it is possible to further stably maintain the installed state of the lamp clips 10 on the reflector 30.

Second Embodiment

In the foregoing embodiment, the holding holes 32a in two (a pair of) fitting holes 32 were provided in the mutually opposed directions to the fitting holes 32b, but they can be arrayed in the same one direction (namely, the longitudinal direction of a plurality of parallelly arranged fluorescent tubes), and such a configuration is described below as another embodiment of the present invention. It is to be noted that the same portion as in the above one embodiment is provided with the same numeral, and the description thereof is omitted.

Figure 5:
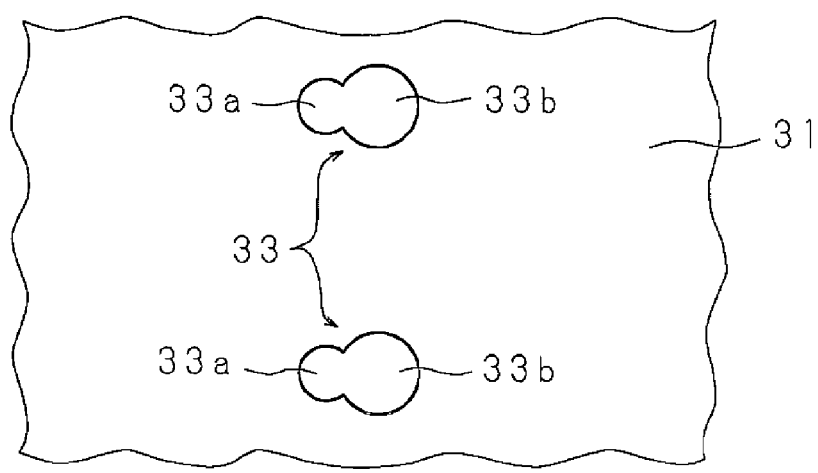
FIG. 5(a) is a plan view of a substantial part of a reflector.
FIGS. 5(b) and 5(c) are plan views show another example of installation of a lamp clip.
Figure 5:
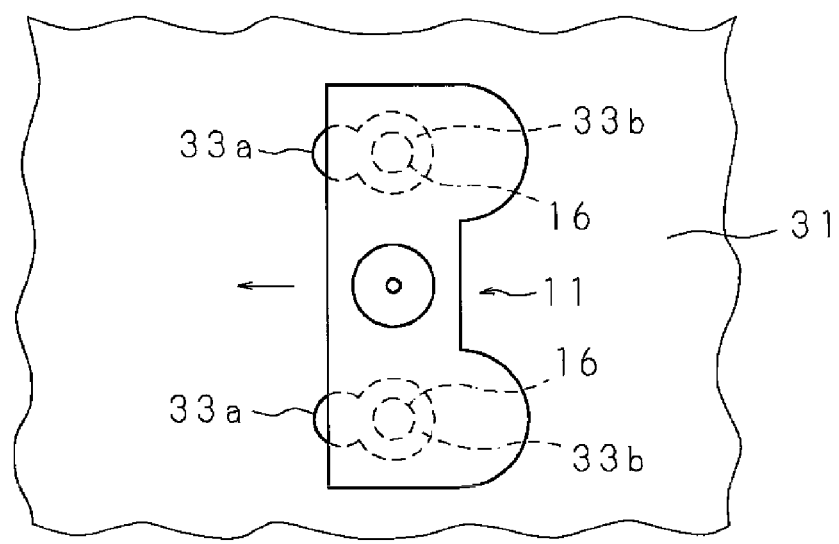
Figure 5:
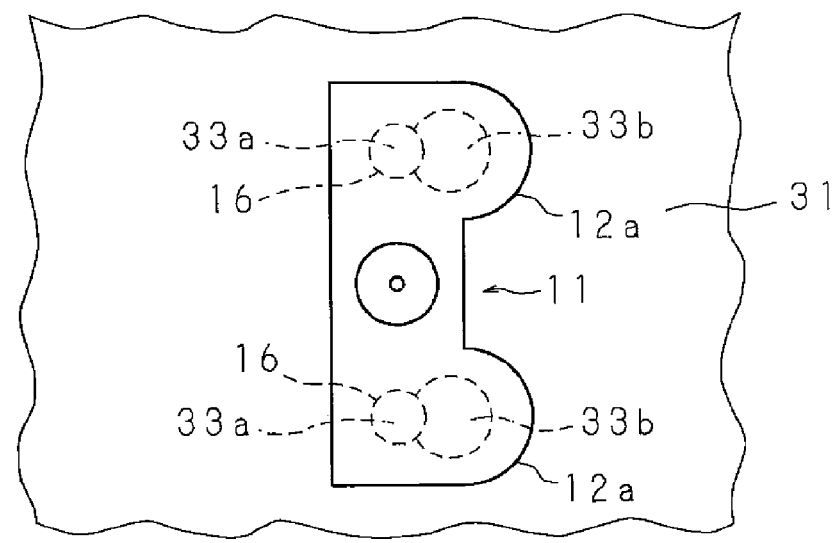

FIG. 5(a) is a plan view of the substantial part of the reflector 30 according to another embodiment. The holding holes 33a in two fitting holes 33 are arranged in the same direction with respect to the insertion holes 33b. In the example of FIG. 5, the two fitting holes 33 are arranged in array in the vertical direction to the longitudinal direction of the fluorescent tubes (namely, the arrangement direction of the fluorescent tubes parallelly arranged in a plurality of number), and the respective holding holes 33a are arranged in array to the left of the insertion holes 33b (namely, in a horizontal direction to the longitudinal direction of the fluorescent tubes).

FIGS. 5(b) and 5(c) are plan views showing the process of installing a lamp clip 11 according to another embodiment. It is noted that the supporting tools 14 of the lamp clip 11 is omitted in the figures. Further, two covering pieces 12a for covering the insertion holes 33b in the fitting holes 33 are provided on a side surface of the same long side of the lamp clip 11.

As shown in FIG. 5(b), two lower projections 16 of the lamp clip 11 are respectively inserted into the insertion holes 33b in the two fitting holes 33 from the opening section side of the chassis. It is noted that the lower projections 16 are inserted until the base body 12 of the lamp clip 11 comes into contact with the reflector 30. After the insertion, as shown in FIG. 5(*c*), the lamp clip 11 is moved to the left in parallel with the surface of the locked plate such as the front surface of the reflector or the bottom surface of the chassis (namely, in one direction parallel to the longitudinal direction of the fluorescent tubes), and the lower projections 16 are fitted into the holding holes 33*a* in the fitting holes 33.

When the lower projections 16 are fitted into the holding holes 33*a* and held therein, the reflector 30, the circuit board and the chassis are integrally held by the base body 12 of the lamp clip 11 and the ends 16*a* of the lower projections 16, and the lamp clip 11 is installed on the reflector 30.

At this time, since the insertion holes 33*b* are covered by the covering pieces 12*a* of the lamp clip 11 from the inside of the box-shaped chassis, light emitted from the light sources (fluorescent tubes) do not pass through the holding holes 33*a*. This enables prevention of light leakage from the back surface of the backlight chassis. Here, typically, luminance unevenness is more likely to occur on the display screen with an increase in size of the lamp clip, but the covering pieces 12*a* of the present embodiment are formed to have projections in an irreducible minimum shape capable of covering the insertion holes 33*b*, namely a shape similar to a peripheral shape of the insertion hole 33*b* (here, arc shape), while the lower projections 16 of the lamp clip 10 are fitted in the holding holes 33*a*, whereby it is possible to prevent light leakage to the back surface of the backlight chassis while suppressing occurrence of local luminance unevenness on the liquid crystal display screen.

Figure 6:
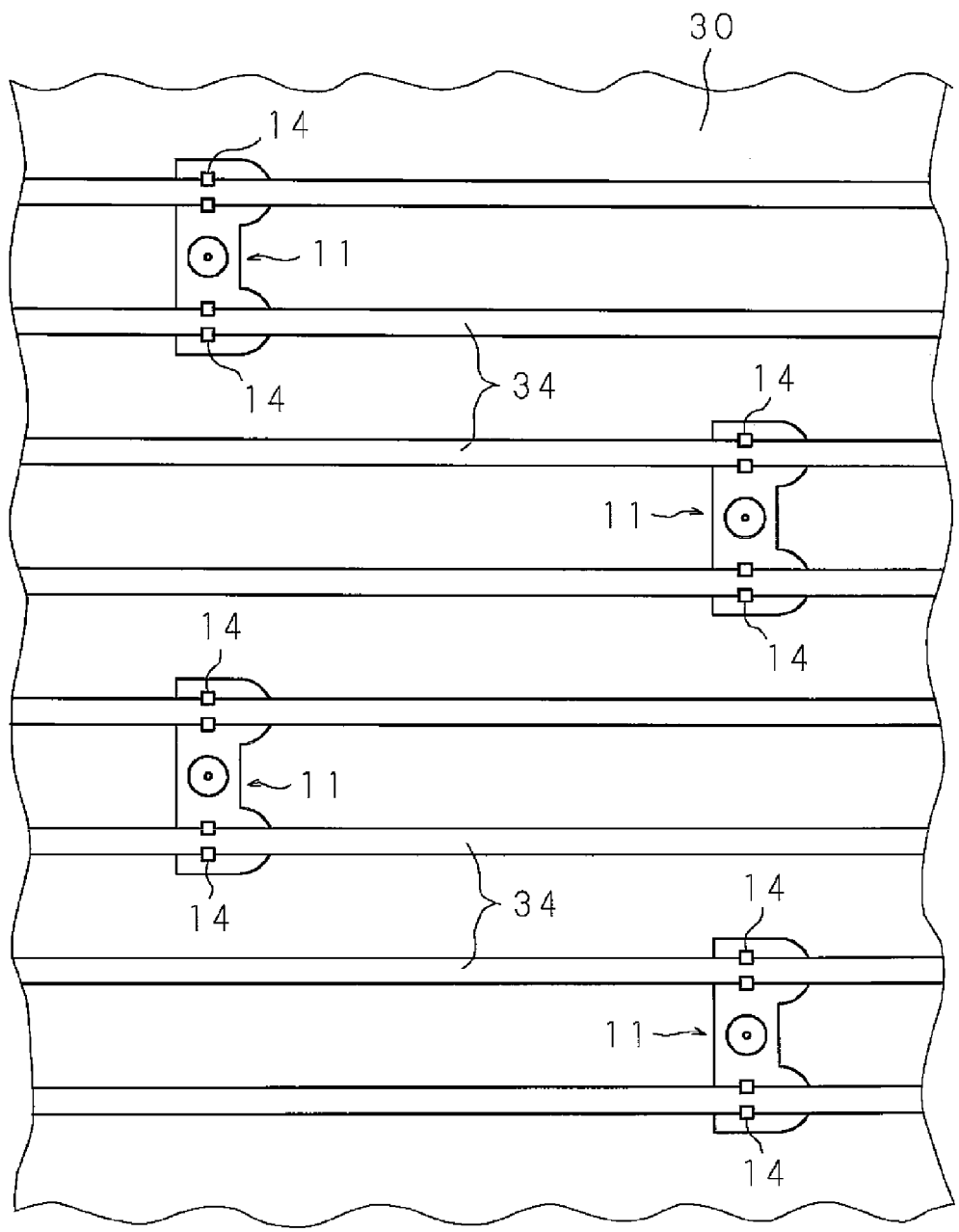
FIG. 6 is a plan view showing an example of the reflector installed with the lamp clips shown in FIG. 5.

It is configured that, in the case of detaching the lamp clip 11, the lamp clip 11 is moved to the right (namely in the opposite direction to the above-mentioned one direction parallel to the longitudinal direction of the fluorescent tubes) so that the lower projections 16 are removed from the holding holes 33*a* in the fitting holes 33, moved to the insertion holes 33*b*, and pulled out from the insertion holes 33*b*, so as to be detached from the opening section of the chassis. FIG. 6 is a plan view showing an example of the reflector 30 installed with the lamp clips 11.

In the present embodiment, as shown in FIG. 5(*b*), a direction in which the holding hole 33*a* and the insertion hole 33*b* are linked is horizontal to a longitudinal direction of the fluorescent tube 34, namely, a moving direction of the lamp clip 11 for installation and detachment is parallel to the longitudinal direction of the fluorescent tube 34, whereby it is possible to move the lamp clip 11 for installation or detachment without applying load on the fluorescent tube 34, so as to solve the problem of damage on the fluorescent tubes that can occur during the operation of detaching the lamp clip. Further, with the use of the lamp clips that simultaneously hold a plurality of the fluorescent tubes, it becomes possible to perform the operations of installing and detaching the lamp clip in the state of supporting the plurality of the light sources, so as to facilitate collective exchange of the plurality of the light sources.

The end 16*a* of the lower projection 16 of the lamp clip 11 may be formed such that the lateral cross section thereof is larger than a fitting portion (caught portion) of the lower projection 16, and can be arbitrarily formed. For example, it can be formed in the turned-back shape as in the conventional technique. When it is formed in the turned-back shape, the lower projection 16 can be inserted into the holding hole 33*a* at the time of installation, and the lower projection 16 can be moved to the insertion hole 33*b* and then pulled out at the time of detachment. In short, the fitting hole in the locked plate, in which the locking section of the lamp clip 11 is held, may be formed in a shape formed of the holding hole 33*a* and the insertion hole 33*b* through the narrow portion.

Figure 7:
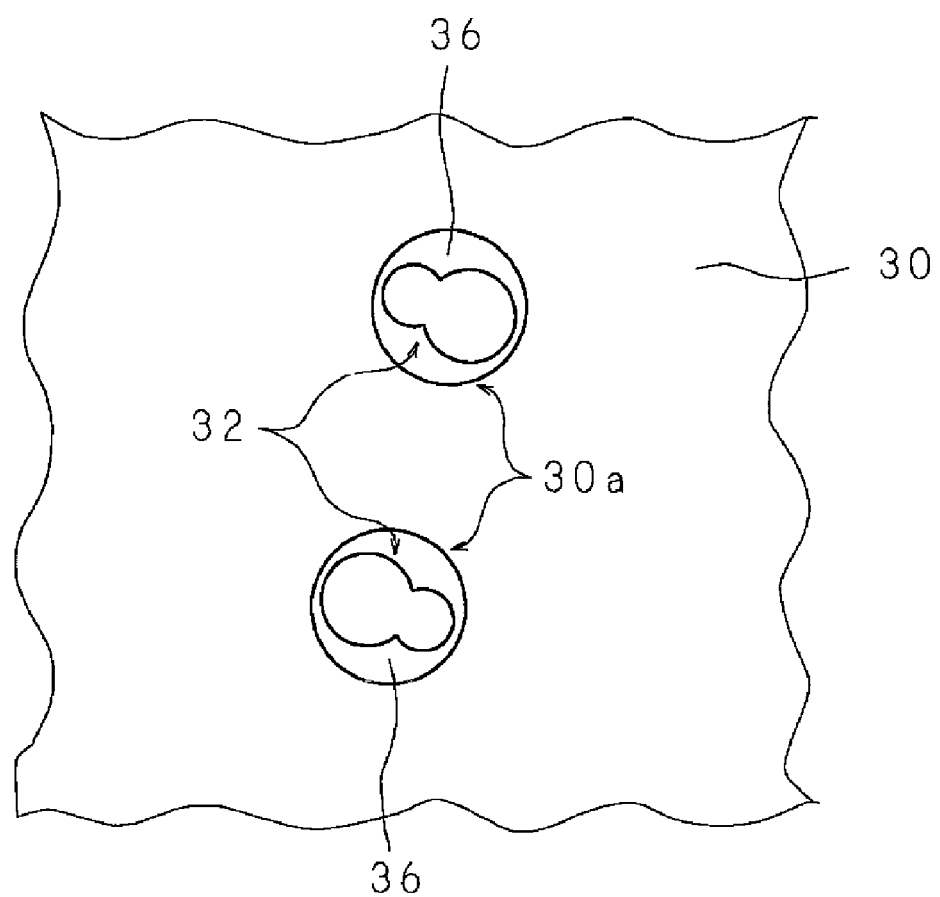
FIG. 7 is a plan view of substantial parts of the reflector and a chassis.
Figure 8:
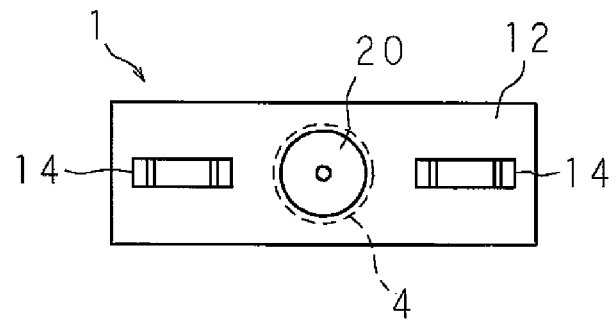
FIG. 8 shows views showing an example of a conventional lamp clip.
Figure 8:
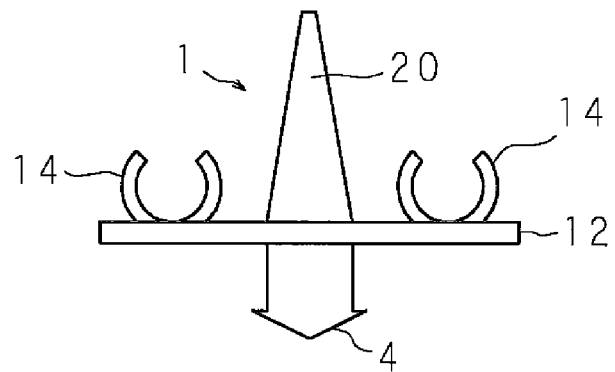
Figure 8:
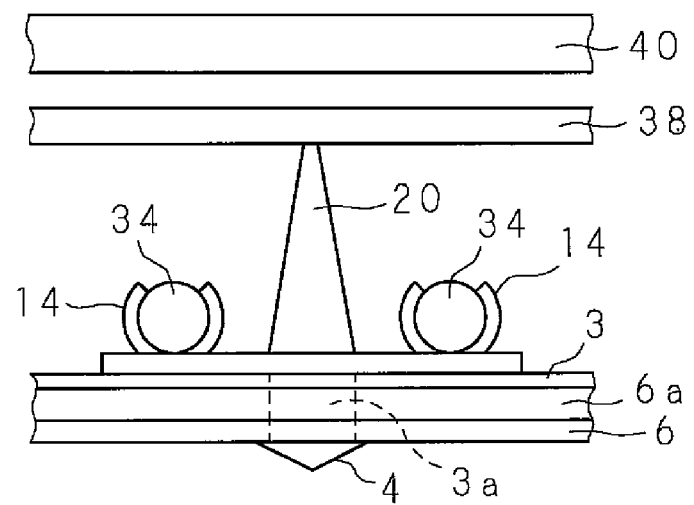
Figure 9:
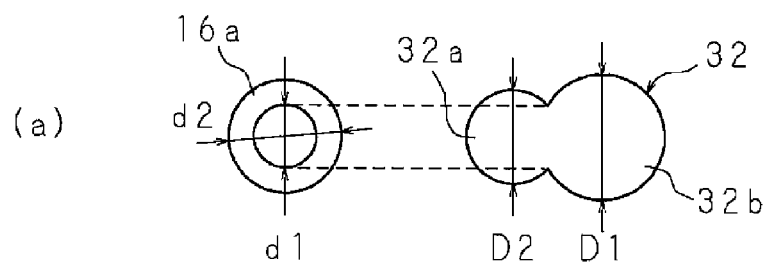
FIG. 9 shows explanatory views explaining a lamp clip described in Patent Reference 2.
Figure 9:
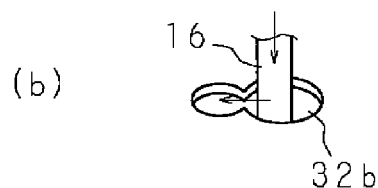
Figure 9:
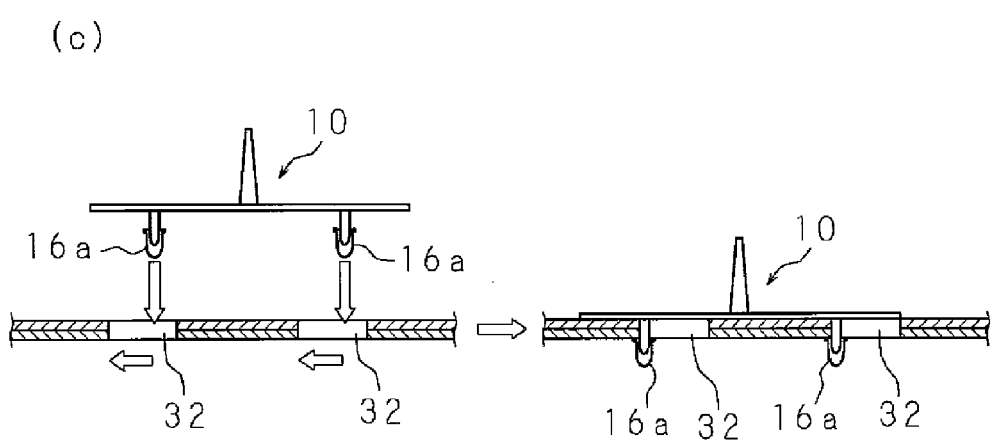

Further, since the lower projection 16 may be fitted into the fitting hole in the chassis 36, the fitting holes in the reflector 30 and the chassis 36*a* may be through holes in an arbitrary shape larger than the fitting hole in the chassis 36 and smaller than the base body 12, such as circular through holes larger than the fitting hole, so that the lower projection 16 can be inserted and moved. In the example of FIG. 7, the foregoing fitting holes 32 each having the insertion hole and the catching section are provided, and circular through holes 30*a* slightly larger than the fitting hole 32 are formed in the reflector 30 and the circuit board.

Thereby, it becomes possible to resolve the problem at the time of assembly in which the end of the lamp clip cannot be passed through the reflector or the circuit board located between the chassis the lamp clip and thus cannot be fixed to the chassis when the end is inserted into the chassis by being passed through the through hole in the reflector or the circuit board.

Further, the shape of the fitting hole 32 is not restricted to the foregoing potbellied shape, but can be an arbitrary shape in which the narrow section is arranged at the midpoint of the through hole, the opening area of one portion of the hole bordered by the narrow section is large to the extent that the lower projection 16 can be inserted, and the opening area of the other portion is small to the extent that the lower projection 16 can be caught.

Although the circuit board 36*a* is provided between the reflector 30 and the chassis 36 in the foregoing embodiments, it is possible not to provide the circuit board 36*a*, needless to say, it may be configured such that the reflector 30 is pressed between the chassis 36 and the lamp clip so as to be fixed. Further, it is also possible to provide an object other than the circuit board 36*a* between the reflector 30 and the chassis 36.

With the above-mentioned configuration, in the backlight device of the present invention, it is possible for the operator to easily perform the operations of installing and detaching the lamp clip from the opening section of the chassis, and simultaneously suppress the phenomenon of light leakage from the fitting hole, provided on the bottom surface of the chassis for insertion and locking of the lamp clip, to the back surface of the backlight.

Furthermore, in the backlight device of the present invention, a variety of ideas are devised for preventing undesirable fall of the lamp clip, or for suppressing the problem of damaging fluorescent lamps at the time of installing and detaching the lamp clip.

In addition, it may be configured in the present invention that a substrate mounted on its one side surface with a plurality of LED elements for applying light in a direction of the liquid crystal panel in place of the reflector 30 or between the reflector and the chassis 36. Application of this configuration to the LED substrate facilitates performance of the operation of assembling or detaching the LED substrate mounted inside the chassis. Namely, it becomes possible to perform the operation of assembling or detaching the lamp clip with the substrate held by one hand, so as to improve the productive efficiency of the operator.

In the backlight device according to the present invention, where the reflector that reflects light from the light sources is installed on the chassis by the lamp clips, the lamp clip may have the lower projections as the locking sections, and the chassis may have fixing sections into which the lower projections are fitted when the lower projections are inserted and moved in a direction along the reflector. Here, the direction along the reflector is, for example, a direction along the front surface of the reflector. Since the lamp clip has the lower projections and the chassis has the fitting sections into which the lower projections are fitted when the lower projections are inserted and moved in the direction along the reflector, in the case of detaching the lamp clip, the projections are moved in the opposite direction to at the time of installation along the reflector to cancel the fixing so that the projections are pulled out, whereby it is possible to easily detach the lamp clip.

It is to be noted that the reflector is also provided with a fitting section as in the chassis or a through hole larger than the fitting section. Further, in the case of installing the reflector and the circuit board on the chassis by the lamp clips, the circuit board is also provided with a fitting section as in the chassis or a through hole larger than the fitting section.

Further, in the backlight device according to the present invention, where the reflector that reflects light from the linear light sources (e.g. fluorescent tubes) is installed on the chassis by the lamp clips, the lamp clip may have the lower projections as the locking sections, and the chassis may have the fixing sections into which the lower projections are fitted when the lower projections are inserted and moved in the direction along the linear light sources. It is to be noted that the lamp clip has light source supporting means for supporting the linear light sources. Further, a circuit board may be provided between the reflector and the chassis. The circuit board is, for example, a substrate mounted with LEDs.

The fitting section may, for example, have a fitting hole which has a narrow section at the midpoint of the opening and in which one portion and the other portion bordered by the narrow section of the opening have different opening areas. Since the fitting section has the fitting hole which has the narrow section at the midpoint of the opening and in which one portion and the other portion bordered by the narrow section of the opening have different opening areas, it is possible to insert the projection into the portion with a larger opening area and moved to the portion with a smaller opening area through the narrow section to be held therein, so as to fix the lamp clip on the reflector.

Further, in the case of detaching the lamp clip, the projection is moved in the opposite direction to at the time of installation and pulled out from the portion with a larger opening area, thereby enabling easy detachment of the lamp clip. The larger opening area is larger than the maximum traversing area of the lamp clip so that the lamp clip can be inserted, and the smaller opening area is as the same level as or slightly smaller than the traversing area of the caught portion of the lamp clip so that the lamp clip can be caught. Moreover, the fitting section may, for example, have an insertion hole into which the projection is inserted, and a holding hole for catching the lower projection as the locking section moved from the insertion hole in the direction along the reflector. Since the fitting section has the insertion section into which the projection is inserted, and the holding hole which catches and holds the projection moved from the insertion section in the direction along the reflector, it is possible to reliably hold the projection in the holding hole, so as to reliably fix the lamp clip on the reflector.

Furthermore, in the case of detaching the lamp clip, the projection is moved in the opposite direction to at the time of installation to cancel the catch by the catching section so that the projection is pulled out from the insertion section, thereby enabling easy detachment of the lamp clip. The opening area of the inserting insertion section is larger than the maximum traversing area of the lamp clip so that the lamp clip can be inserted, and the opening area of the catching section is as the same level as or slightly smaller than the traversing area of the caught portion of the lamp clip so that the lamp clip can be caught. The lamp clip according to the present invention, which installs the reflector for reflecting light from the light sources on the chassis, may have the lower projections as two locking sections to be fitted into the fitting sections of the chassis. Further, a chassis for backlight according to the present invention, where the reflector for reflecting light from the light sources is installed by the lamp clips, may have a fitting hole which has a narrow section at the midpoint of the opening and in which one portion and the other portion bordered by the narrow section of the opening have different opening areas.

It is to be noted that, although the chassis that houses the optical members such as the light sources and the reflector, the reflector provided on the bottom surface of the chassis, and the like, can be considered as members to be the locked plates, particularly when such an installation mechanism is constituted in the chassis, it becomes possible to install the reflector in the state of being caught by the base body of the lamp clip and the bottom surface of the chassis, and further, since the reflector can be easily detached when the lamp clip is detached from the opening section of the chassis, it is possible to improve the operative efficiency at the time of performing the operation of installing or exchanging the reflector. Above all, when the reflector is in sheet shape, it is highly effective to fix the reflective member by the lamp clip according to the present invention.

Moreover, although the covering piece 12a was formed of a semicircular projecting section in the foregoing embodiment, since its purpose is to cover the insertion hole by the base body 12, the covering piece 12a may have any size and shape so long as being capable of covering the insertion hole. It is noted that, as descried above, making the size of the lamp clip itself as small as possible is necessary for the purpose of suppressing occurrence of luminance unevenness due to the lamp clip, and hence the covering piece 12a is desirably formed of a projecting section having an identical shape as that of the insertion hole.

Moreover, although the case was described where the insertion hole and the holding hole in the fitting hole are circular, the insertion hole may have any size and shape so long as having a size into which the locking section can be inserted, and the shape of the holding hole is not restricted to circular so long as being a size in which the locking section of the lamp clip can be held and locked.

As thus described, when the lamp clip of the present invention is installed in the manner shown in the above embodiments and the backlight device is manufactured, the strength against impact and the like from the outside of the lamp clip increases, to stabilize the optical system inside the backlight device. Further, detachment, exchange and the like of the reflector, the LED substrate and the like inside the backlight device are easily performed.

INDUSTRIAL APPLICABILITY

The present invention is available for a backlight device using linear light sources.

What is claimed is:
1. A backlight device, comprising:
   a linear light source;
   a lamp clip for holding said linear light source; and
   a locked plate to which said light clip is locked, wherein
      said lamp clip comprises:
         locking sections provided on a base body and locked by said locked plate, and
         a pair of covering pieces provided on the base body;
      said locked plate has a pair of fitting holes;

each of said fitting holes comprises:
- an insertion hole into/from which said locking section is inserted/pulled out, and a holding hole in which said locking section is locked,
- a direction in which said insertion hole and said holding hole are linked is parallel to the longitudinal direction of said linear light sources; and each of said covering pieces completely covers said insertion hole comprised by each of said fitting holes.

2. The backlight device according to claim 1, comprising:
said holding hole of one of said fitting holes is arranged point-symmetrically to said holding hole of another one of said fitting holes.

3. The backlight device according to claim 1, including more than one pair of fitting holes, and the fittings holes in each pair are juxtaposed in a substantially vertical direction to the longitudinal direction of said linear light source.

4. The backlight device according to claim 1, including more than one pair of fitting holes, and a direction in which said fitting holes of each pair are linked is vertical to the longitudinal direction of said linear light source.

5. The backlight device according to claim 1, wherein said insertion hole has a shape with an area larger than that of said holding hole.

6. The backlight device according to claim 1, wherein said lamp clip has a shape of covering said insertion hole in a state where said locking section is locked in said holding hole.

7. The backlight device according to claim 1, wherein
a plurality of said light sources are provided, and
said lamp clip simultaneously holds said plurality of linear light sources.

8. The backlight device according to claim 1, wherein
said locking sections have an end section and a projecting section that links said end section and said base body, and
said end section has a larger cross sectional area than that of said projecting section on a cross section parallel to a surface of said base body.

9. The backlight device according to claim 1, wherein said locked plate is a chassis or a reflector.

10. A liquid crystal display device comprising the backlight device according to claim 1 and a liquid crystal panel.

* * * * *